US009415531B2

(12) United States Patent
Aktas

(10) Patent No.: US 9,415,531 B2
(45) Date of Patent: Aug. 16, 2016

(54) METHOD AND DEVICE FOR PRODUCING AN OPTIMIZED BASE CONTOUR ON PREFORMS

(71) Applicant: Mahir Aktas, Balcova Izmir (TR)

(72) Inventor: Mahir Aktas, Balcova Izmir (TR)

( * ) Notice: Subject to any disclaimer, the term of this patent is extended or adjusted under 35 U.S.C. 154(b) by 80 days.

(21) Appl. No.: 14/380,782

(22) PCT Filed: Feb. 22, 2013

(86) PCT No.: PCT/DE2013/000111
§ 371 (c)(1),
(2) Date: Aug. 25, 2014

(87) PCT Pub. No.: WO2013/123931
PCT Pub. Date: Aug. 29, 2013

(65) Prior Publication Data
US 2015/0021827 A1 Jan. 22, 2015

(30) Foreign Application Priority Data

Feb. 24, 2012 (DE) .......... 10 2012 004 613

(51) Int. Cl.
| B29C 49/68 | (2006.01) |
| B29B 11/08 | (2006.01) |
| B29C 49/06 | (2006.01) |
| B29C 49/64 | (2006.01) |
| B29C 45/00 | (2006.01) |
| B29C 49/00 | (2006.01) |
| B29C 45/72 | (2006.01) |
| B29K 105/00 | (2006.01) |
| B29D 22/00 | (2006.01) |
| B29L 31/00 | (2006.01) |

(52) U.S. Cl.
CPC ............ *B29B 11/08* (2013.01); *B29C 45/0055* (2013.01); *B29C 45/7207* (2013.01); *B29C 49/0073* (2013.01); *B29C 49/06* (2013.01); *B29C 49/6427* (2013.01); *B29B 2911/14013* (2013.01); *B29B 2911/14326* (2013.01); *B29B 2911/14486* (2013.01); *B29C 2045/725* (2013.01); *B29C 2049/0089* (2013.01); *B29D 22/00* (2013.01); *B29K 2105/253* (2013.01); *B29L 2031/7158* (2013.01)

(58) Field of Classification Search
CPC ................ B29B 2911/14486; B29C 2045/725
See application file for complete search history.

(56) References Cited

U.S. PATENT DOCUMENTS

| 3,949,033 A | 4/1976 | Uhlig |
| 4,005,969 A | 2/1977 | Farrell |

(Continued)

FOREIGN PATENT DOCUMENTS

| DE | 2450696 A1 | 5/1975 |
| DE | 102009030762 A1 | 1/2011 |

(Continued)

*Primary Examiner* — Jill Heitbrink
(74) *Attorney, Agent, or Firm* — Lucas & Mercanti, LLP; Klaus P. Stoffel

(57) ABSTRACT

The present invention relates to a method and a device for producing a preform with a base geometry optimized for the subsequent stretch blow molding. The preform produced in the injection mold is removed in a cooled removal sleeve and cooled in the shaft by intensive contact cooling, while to the greatest extent no cooling contact is made with the domed preform end due to a special contour of the cooling sleeve. On account of the re-heating of this domed end that is possible as a result, the latter can be mechanically deformed into a new geometry that is more advantageous for the blow-molding process, and consequently also influenced in the wall thickness. In the subsequent blow-molding process, such a deformed preform has primarily the advantage that the polymer material distributed better in the bottle can lead to considerable material savings and to bottle bases of a higher quality.

19 Claims, 10 Drawing Sheets

(56) References Cited

U.S. PATENT DOCUMENTS

| | | |
|---|---|---|
| 2006/0138696 A1 | 6/2006 | Weinmann |
| 2012/0193838 A1 | 8/2012 | Bock et al. |

FOREIGN PATENT DOCUMENTS

| | | |
|---|---|---|
| JP | H04126206 A | 4/1992 |
| WO | 2004041510 A1 | 5/2004 |
| WO | 2008041186 A2 | 4/2008 |
| WO | 2010149522 A1 | 12/2010 |

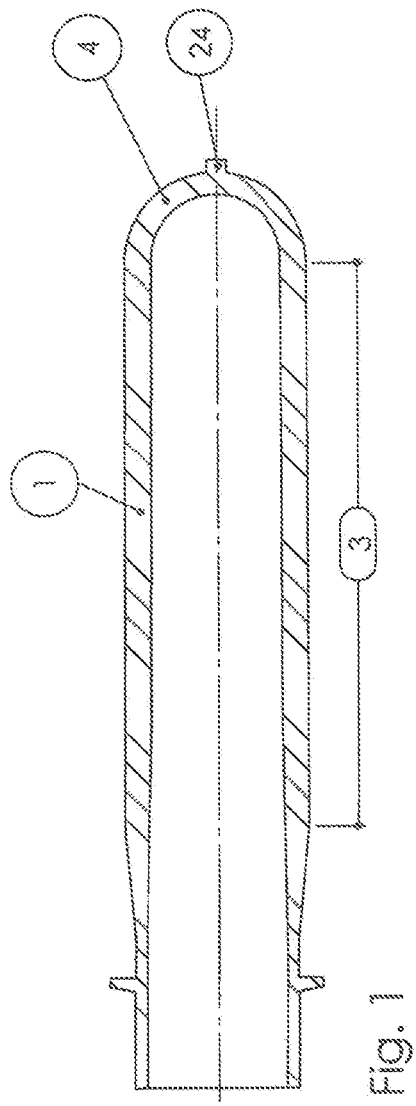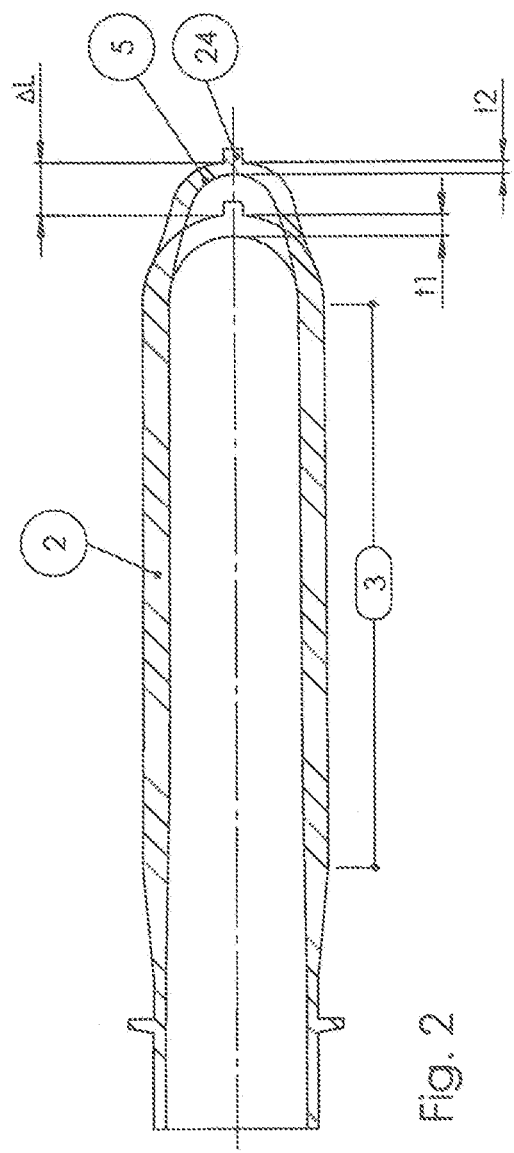

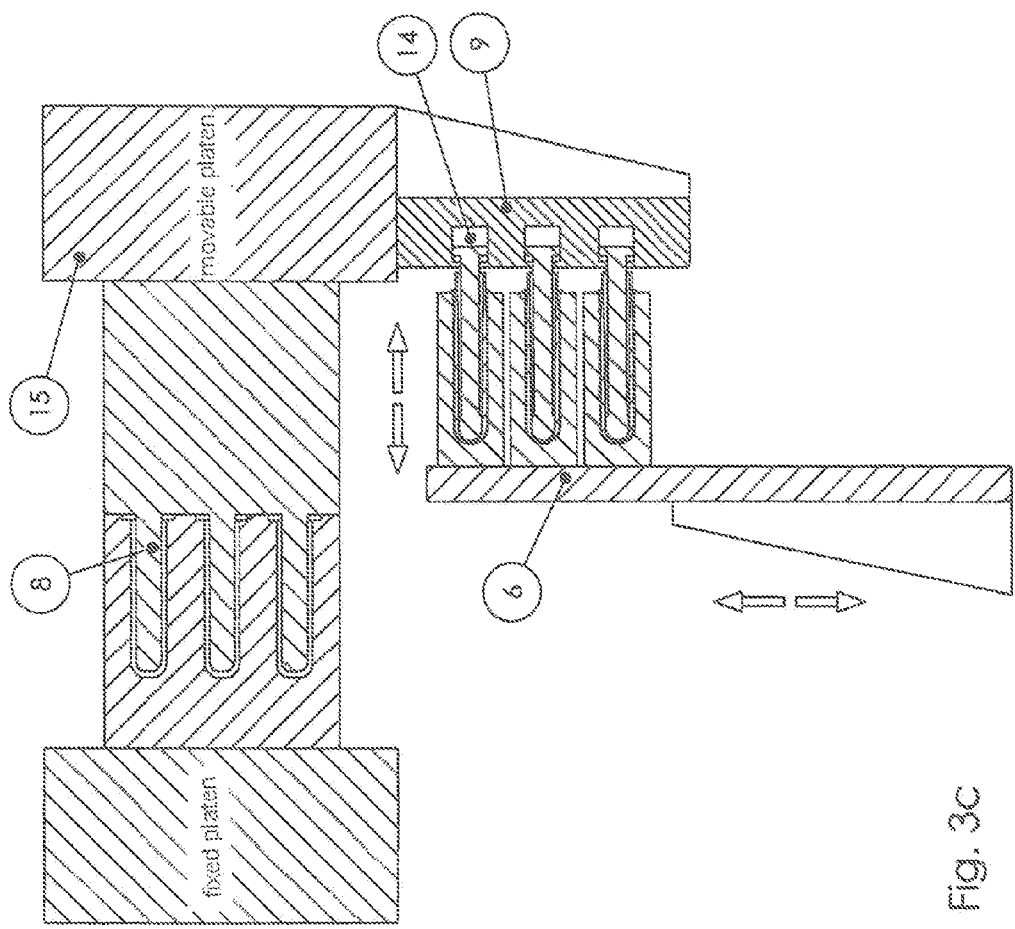

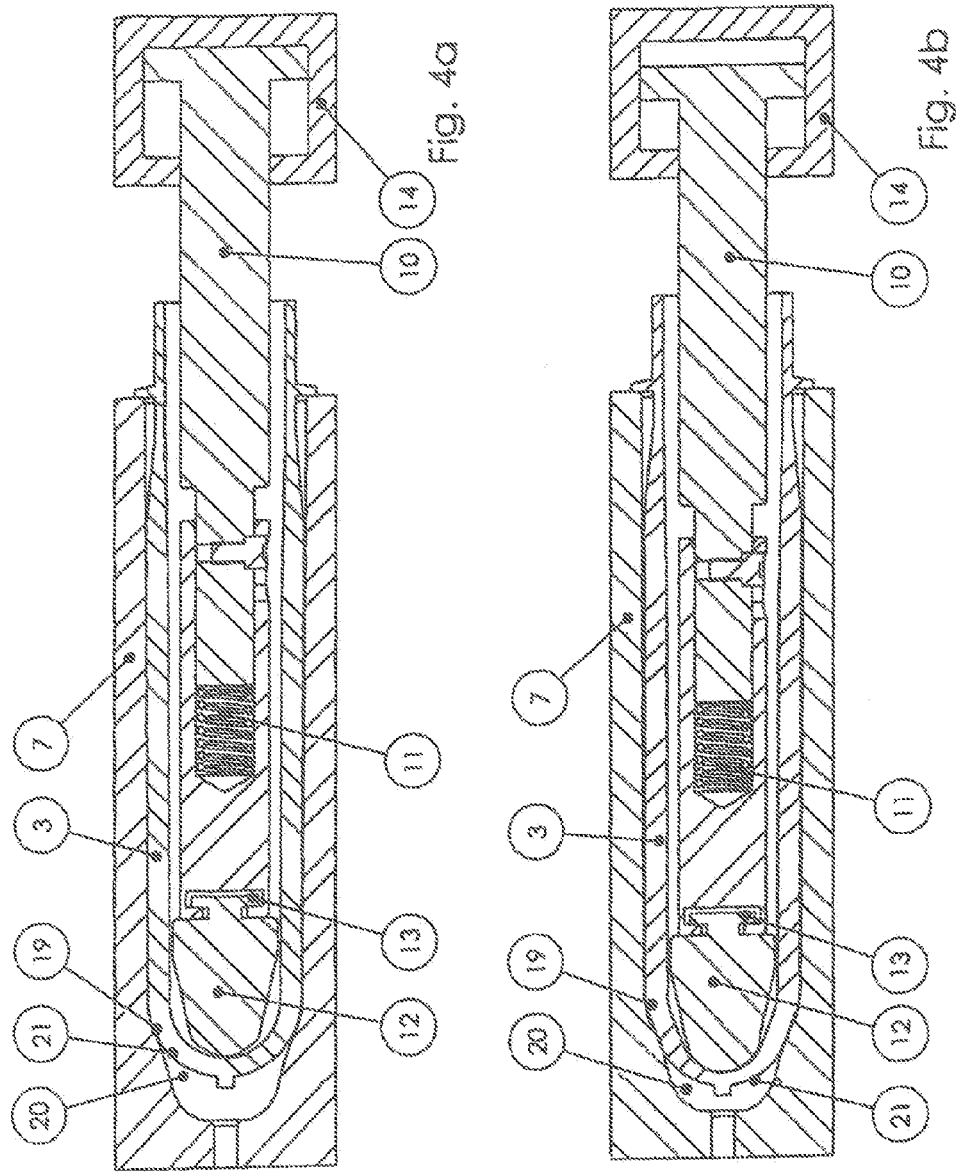

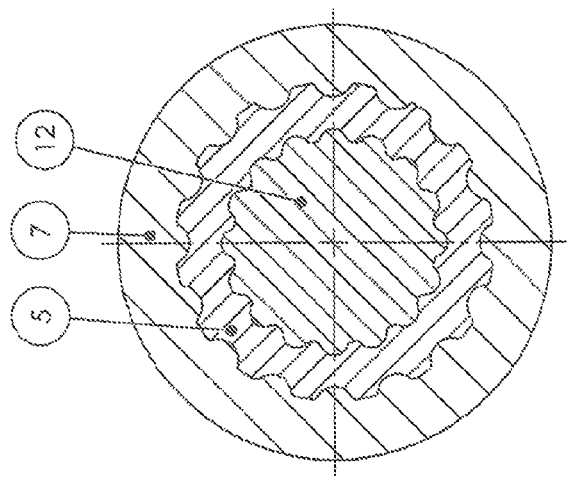
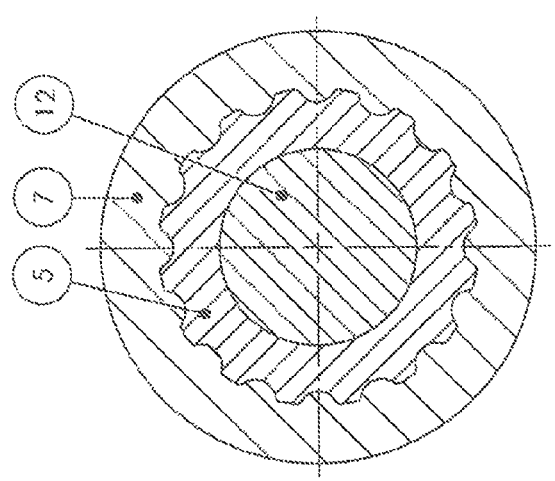
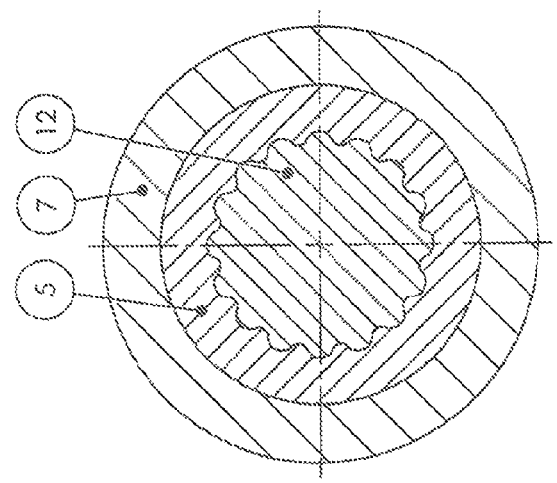
Fig. 7a

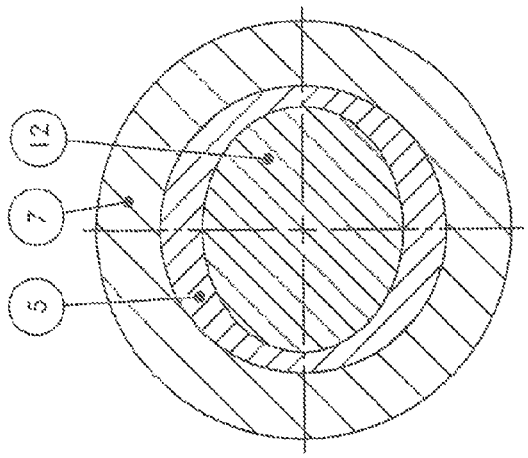
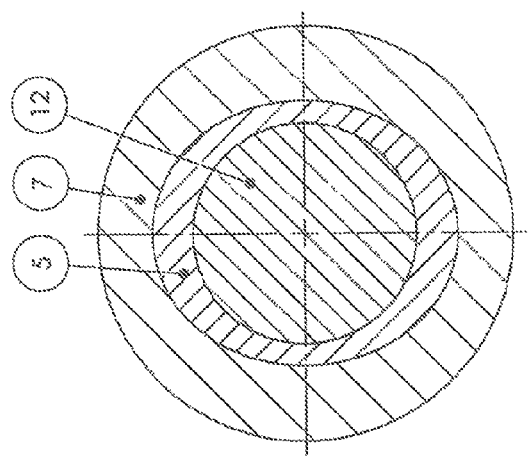
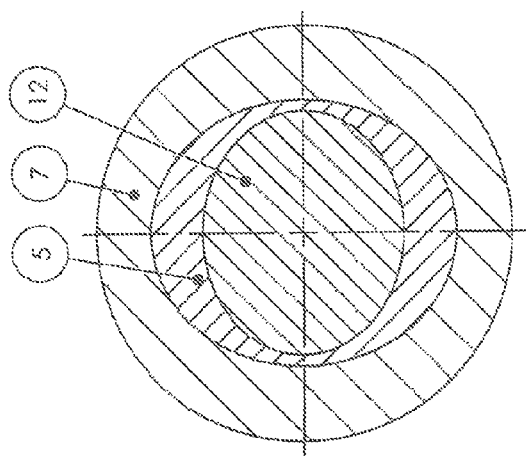
Fig. 7b

METHOD AND DEVICE FOR PRODUCING AN OPTIMIZED BASE CONTOUR ON PREFORMS

The present application is a 371 of International application PCT/DE2013/000111, filed Feb. 22, 2013, which claims priority of DE 10 2012 004 613.8, filed Feb. 24, 2012, the priority of these applications is hereby claimed and these applications are incorporated herein by reference.

BACKGROUND OF THE INVENTION

The present invention relates to a method and a device for producing preforms for molding an advantageous base geometry for a later blow-molding process.

Preforms are injection-molded blanks of at least one thermoplastic material that are used in blow-molding machines for the production of stretch-blow-molded plastic containers.

For the customary production of preforms described according to this invention, polymer raw material is plasticized and subsequently forced at high pressure into a single- or multi-cavity mold.

This produces preforms according to FIG. 1, which geometrically consist substantially of a neck and shaft region and a domed base end, and are hollow on the inside due to the insertion of a core in the mold. The neck region is shaped in such a way that it may for example be configured so as to be re-closable with a screw cap. The neck region, however, does not undergo any further change during the blow-molding process. By contrast, the shaft region and the domed base end are inflated at elevated temperatures to form hollow bodies, whereby the polymer is stretched and at the same time considerably solidified. Therefore, in conjunction with the core geometry, the preform regions to be deformed are geometrically responsible for the quality of the bottle that is later obtained.

Since the mold usually represents the greatest investment in a production system, great value is attributed to it operating efficiently. Thus, the preform, the outer skin of which is in direct contact with the intensively cooled steel of the mold, and consequently solidifies quickly there, is demolded without any damage and without mechanical deformation, in order that the mold is ready for the next production cycle without any time being lost.

With the customary high-speed production cycles, a considerable residual heat remains in the interior of the preform wall, which leads to a re-heating, whereby the preform can soften again and crystallize out, which makes it become unusable.

It is therefore indispensable to continue intensively cooling the preform after demolding in simpler mold parts, known as cooling sleeves, during several production cycles.

The preform, as it is represented in FIG. 1, corresponds to the current state of the art, in which it is inevitable that the wall thicknesses of the preform have similar wall thicknesses, particularly in the region of the domed base end and the shaft. If the material sets prematurely due to thinner wall thicknesses in the gating region, shrinking in the cooling phase due to follow-up pressure on the melt cannot be avoided, with an effect on the entire preform including the neck region, which as a consequence leads to undesired sink marks in critical regions of the preform.

The preform geometry, as it is shown in FIG. 2 and the advantages of which are still to be explained below, therefore cannot be produced by the known injection-molding process, since the wall thickness is much thinner in the region of the domed preform end, and consequently in the vicinity of the gate, than in the further progression of the preform shaft, and consequently sink marks as a result of premature setting of this thin region, particularly in the neck region, can no longer be avoided.

SUMMARY OF THE INVENTION

The central problem that is addressed by the present invention is that of describing a method and a device by which preforms with much more favorable base contours, which are advantageous for the later stretch blow molding, can be produced.

A re-shaping of the preform base contour allows the surface area thereof in this region to be enlarged. This already has advantages, since the infrared heaters of the downstream blow-molding machines can introduce thermal energy more efficiently by way of this enlarged surface area and the stretching rod of the blow-molding machine can better influence the wall thickness of the finished bottle during the blow-molding process.

The advantages of this optimized base shape are described for example in WO 2008/041186 A2 and are known to those skilled in the art as the "Capello Design". Though it can be designed in any way desired, since the base contour described there is already produced during the injection-molding process, the wall thickness can scarcely be influenced because of the physical properties described above.

However, the actual advantage for the later inflation of the base of the bottle lies in a much thinner wall thickness of the domed preform end. This configuration is also described in the application WO 2010/149522 A1. It has been recognized that much thinner wall thicknesses than can be achieved by injection molding are advantageous in the region of the domed end of the preform. Here, the preform produced by the standard process is put under pressure with pressurized air in the downstream cooling sleeve. The cooling sleeve is in this case formed in such a way that the base region can still be inflated until the enlarged base contour brings an end to this deformation. This leads to the desired surface area enlargement, with at the same time a reduction in the wall thickness. This method is much better in terms of its result than the Capello Design, but the inflating operation can scarcely be controlled. Thus, inhomogeneous temperatures may have the effect that the gate deviates from the center. Moreover, the precise progression of the wall thickness in the region of the domed end is not predictable, but is subject to the thermal conditions that happen to occur around the domed preform end.

A physical basis of the invention can be seen in the fact that, in principle, without further continuance of the cooling, the preforms removed from the mold re-soften, i.e. settle to a certain temperature level, and as a result become easily deformable again. While the preform shaft and the domed preform end are cooled by contact cooling in the cooling sleeve, as described in the prior art, the cooling contact then does not occur for the domed preform end, due to a modification of the cooling sleeve contour in the region of the domed end, as a result of which it is re-heated to about 90-130° C., and consequently becomes deformable again. It is a natural consequence of this that the hottest point is the gating point, since that is where the last hot melt was supplied during the process of applying the follow-up pressure. In the further progression of the domed end, the temperature then gradually decreases, whereby the material correspondingly becomes of a higher viscosity.

By contrast with the prior art, in which the preform is always intensively cooled in the post-cooling, in order to obtain a preform that is generally solidified as much as possible, the basic idea of the invention is that the modified base geometry of the cooling sleeve, which thereby eliminates direct contact with the preform base, does away with intensive cooling of the preform base, and consequently allows a re-heating of this region. After conditioning for a few seconds, the preform base normally has a temperature progression that gradually decreases from the point of injection to the preform shaft and is optimal for subsequent, specific mechanical deformation. This temperature progression in the domed base end is responsible for the hottest point being the most easily deformable, while this gradually decreases in the further progression of the domed end. This has the effect that, in the subsequent mechanical deformation by means of a specially shaped embossing body, the gating region becomes the thinnest, while the wall thickness of the domed end becomes increasingly thicker in the further progression to the shaft, until finally it merges seamlessly with the shaft. This avoids an abrupt change in wall thickness, which would have a lasting adverse effect in the blow-molding process of the bottle.

The embossing body, produced from solid material, for example from Teflon, is designed such that, in the deforming operation, it preferably first contacts the gating point and only gradually deforms the entire region of the domed end in the further course of axial movement, always starting from the gate, likewise in an embossing manner. Embossing is understood as meaning that the material in a plastic state of the domed preform end is shaped by pulling, pressing and pushing in a way that is precisely predetermined by the cooling sleeves and the embossing body. Depending on the inside diameter of the preform and the temperature of the domed preform end, axial embossing forces of 5 to 100 N are appropriate, but they may also be much higher. For example, an elliptical embossing body could be ideal for a domed end contour of the preform that is spherical. However, it is also conceivable to use plastically deformable embossing bodies, which for example may be produced from silicone. Such embossing bodies make it possible not to start the embossing operation directly at the gate, but at some other desired location within the domed end. Due to the elastic deformability of the embossing mandrel, the gating region would only be deformed later.

This device could be appropriate for example whenever the gradual temperature progression in the domed preform end is found to be disadvantageous because, after the embossing, the gating region has wall thicknesses that are too thin, which could have adverse effects later in the case of bottles for pressure applications, such as for example for carbonated beverages, and it is intended to counteract this temperature progression. It is of advantage in this case if, after the deforming operation, the base contour of the preform on the inside precisely replicates the embossing body and on the outside replicates the base geometry of the cooling sleeve. The domed preform end that is re-shaped after the embossing process, and is then likewise in intensive cooling contact with the base of the cooling sleeve, can then cool very quickly due to the enlarged surface area and the thinner wall thickness, so that the feared onset of crystallization does not occur.

A further possibility for influencing the embossing operation in the domed preform end with respect to the wall thickness progression is the possibility of actively controlling the temperature of the embossing body or cooling the embossing body. With a temperature-controlled embossing body, the contact area with respect to the preform base could be stamped thinner, whereas with cooled embossing mandrels it could then conversely become thicker.

Owing to cooling that is intensive from the outset in the region of the preform shaft, the latter is to the greatest extent excluded from the mechanical embossing operation of the domed preform end, since the cooled outer skin of the polymer material is strong enough to withstand these deformation forces. This property makes the entire deforming operation of the preform reproducible. In the other case, the preform shaft would stretch axially and the deformation work would have a lasting adverse effect in the domed preform end.

A further possible problem at the shaft during the embossing is that, for unproblematical removal from the mold, it often has a very small angle of just a few minutes, which for reliable cooling is also the case in the cooling sleeve. Due to the axial forces of the embossing operation and the already hardened preform shaft, the latter may become jammed because of the small angle, and only allow itself to be removed again with difficulty. Moreover, the axial position of the preform in the cooling sleeve would be scarcely reproducible. Therefore, the original progression of the domed end of the preform before the embossing is replicated in the cooling sleeve for a small region, so that a small supporting area with an undercut of just a few tenths of a millimeter is produced for the preform. In this way, the preform is reliably positioned and cannot become jammed under the axial forces.

A preform with the re-shaped base described offers great advantages for the subsequent stretch blow-molding process. The gating point, which is later at the greatest distance from the heating-up device of the blow-molding machine, is conventionally difficult to heat up—or can only be heated up with the disadvantage that closer regions become too hot. The reason for this is that the power of the heating radiation decreases by a quadratic function with distance. As a consequence, the material in the base region, most particularly at the gate, cannot be satisfactorily stretched, as a result of which most stretch-blow-molded plastic bottles have an unnecessary accumulation of material in the bottom region, which may even lead to weakening of the base.

With the now much thinner preform wall thickness at the gating point, which in the further progression of the domed end to the preform shaft deliberately becomes thicker in the progression, and seamlessly adjoins there, the wall thickness and the distance from the heating-up device are in a perfect relationship. The heating-up behavior of the domed preform end is optimal. In the case of such re-heated preforms, the entire superfluous polymer material can be drawn out of the base region during the inflating process, and in this way ultimately be saved. In addition, the base region is additionally strengthened by the then possible higher degrees of stretching, whereby the quality of the base of the bottle is much enhanced.

A further possibility is to stamp the preform bases in molds that resemble the finished shape of the base of the bottle. Bottles may for example be oval, or the bases have feet, making it difficult for the material to be distributed uniformly in the base region during the stretch blow molding. The shaping preparation of the preform bases allows a better material distribution to be achieved later. This shaping may be introduced at the embossing mandrel or in the cooling sleeve. It goes without saying that this may also take place at both locations simultaneously or sequentially. Other shapings provide the possibility of increasing the surface area of the domed preform end by waves, lines or roughness. This would likewise assist the energy transmission from the IR heating of the blow-molding machine.

In principle, the embossing method has no influence on the production cycle time, since the time of the injection molding in the mold takes longer than the embossing operation.

BRIEF DESCRIPTION OF THE DRAWING

The invention is explained in more detail below and with reference to the accompanying drawings, in which:

FIG. 1 shows a preform in cross section with a round domed end as it is usually produced according to the prior art FIG. 2 shows a preform in cross section with a base geometry that has been shaped by an embossing operation after the injection-molding process in the post-cooling station and the wall thickness progression of which to the gating point can be modified as desired FIG. 3c shows a schematic view after a closing operation of the mold, the embossing unit, which here is connected to the movable platen, being moved at the same time and as a result the embossing operation being initiated and able to be performed as desired by individually movable pressure units FIG. 4a shows a side view of an individual embossing device consisting of the cooling sleeve with an individual base contour, a preform before the embossing operation and an embossing body with floating mounting, which has been geometrically determined by a base contour of the cooling sleeve; the embossing mandrel is optionally axially driven individually for the embossing operation FIG. 4b shows a sectional view similar to 4a with the embossing operation initiated FIG. 7a shows a geometrically predetermined embossing body in conjunction with a cooling sleeve that have ribs and/or are roughened for surface area enlargement FIG. 7b shows a geometrically predetermined embossing body in conjunction with a cooling sleeve that is geometrically made to match the shaped bottle base, such as oval in this example.

DETAILED DESCRIPTION OF THE INVENTION

The drawings are intended to assist the explanation that follows of the embossing operation of the domed preform end.

FIG. 1 shows a preform produced according to the prior art, generally with a spherical domed end, which however may also have other geometries. In this case, the wall thickness of the domed preform end 1 generally comprises about 80% of the wall thickness of the preform shaft 3. Preforms that are optimized for the blow-molding process, according to FIG. 2, with thinner wall thicknesses at the gate 4, cannot be realized by injection-molding techniques on account of the risk of the melt setting, since the follow-up pressure that counteracts the shrinking of the preform during the cooling process can then no longer act in the decisive thicker-walled regions.

Figure 3A:
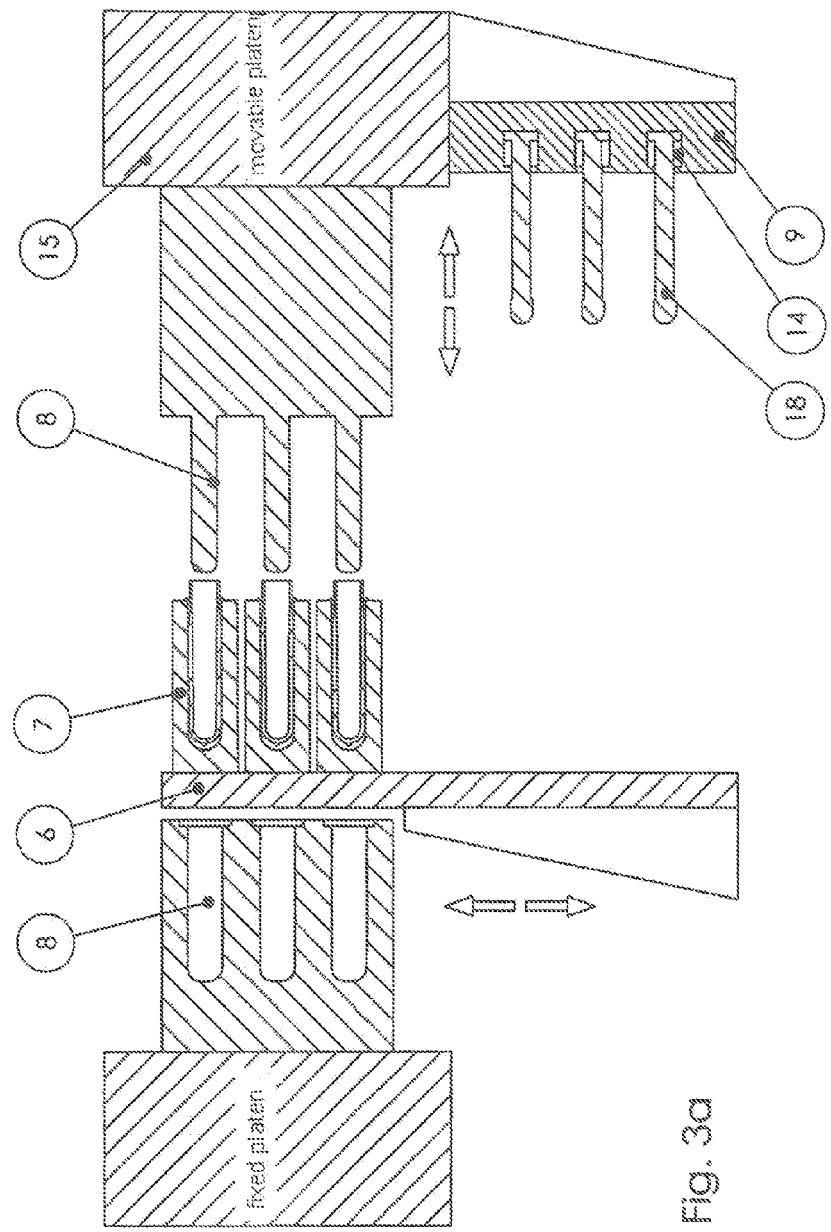
FIG. 3a shows a schematic view during the completion of an injection-molding process with an open mold with an extended removal arm for the removal of preforms; as a possible option, here the embossing unit is connected to the movable platen

In order to be able nevertheless to produce a preform such as that shown in FIG. 2 by the conventional injection-molding technique, the preform is first produced in the usual way in a mold 8 and removed in the usual way by a removal arm 6 after the first cooling and opening of the mold according to FIG. 3a. The removal arm 6 has in this case a multiplicity of cooling sleeves 7, in which the preform according to FIG. 1 is usually inserted as far as the neck region.

Both the injection-molding machines with the mold 8 and the removal arm 6 are sufficiently well known from the prior art.

In FIG. 3a, three cooling sleeves 7 of such a removal arm 6 are represented by way of example. The initially produced preform according to FIG. 1 has a conventional shape with a relatively thick wall thickness 4 in the base region and is held in a water-cooled cooling sleeve 7 with almost complete, direct contact in its outer body region. There is likewise no need to discuss this cooling, operated with liquids or gases, in any more detail in the present case since it is known in various configurational variants from the prior art.

The preform positioning that is represented in FIG. 4a shows that the cooling sleeve 7 has an enlarged geometry 20 in the base region, whereby direct cooling contact is prevented at the preform base 21. As a result, directly after the preform is taken over by the removal arm 6, the preform shaft 3 is intensively cooled, while the domed preform end 4 can be homogenously re-heated, and thereby softened again, because of the absence of cooling. The number of cooling sleeves 7 may be a multiple of the number of cavities in the mold to intensify the cooling of the preform. This allows the residence time of the preform in the cooling phase to last over several injection-molding cycles.

Figure 3B:
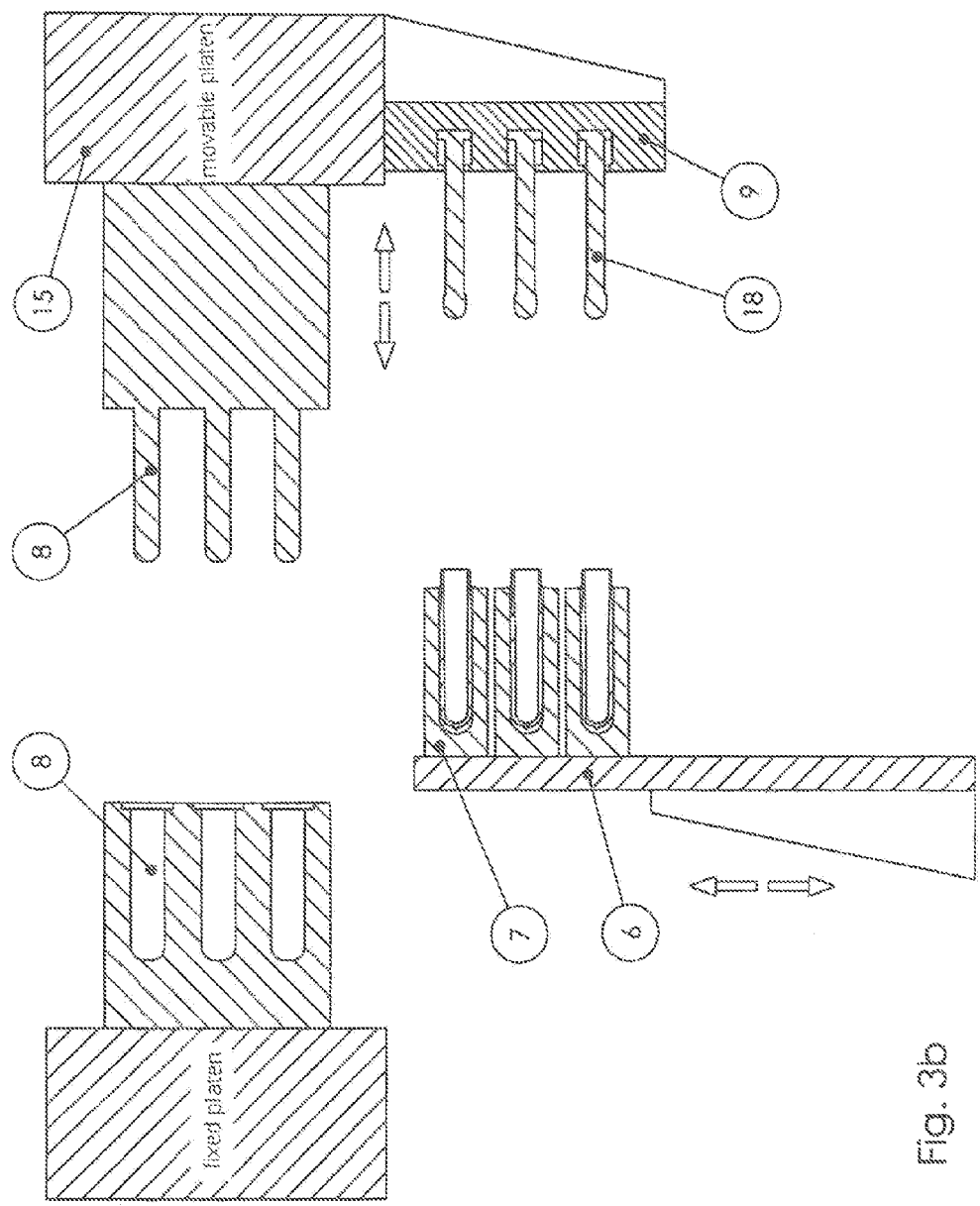
FIG. 3b shows a schematic view with the removal arm retracted from the open mold with simultaneous positioning of the preform mouths in relation to the embossing unit
Figure 4C:
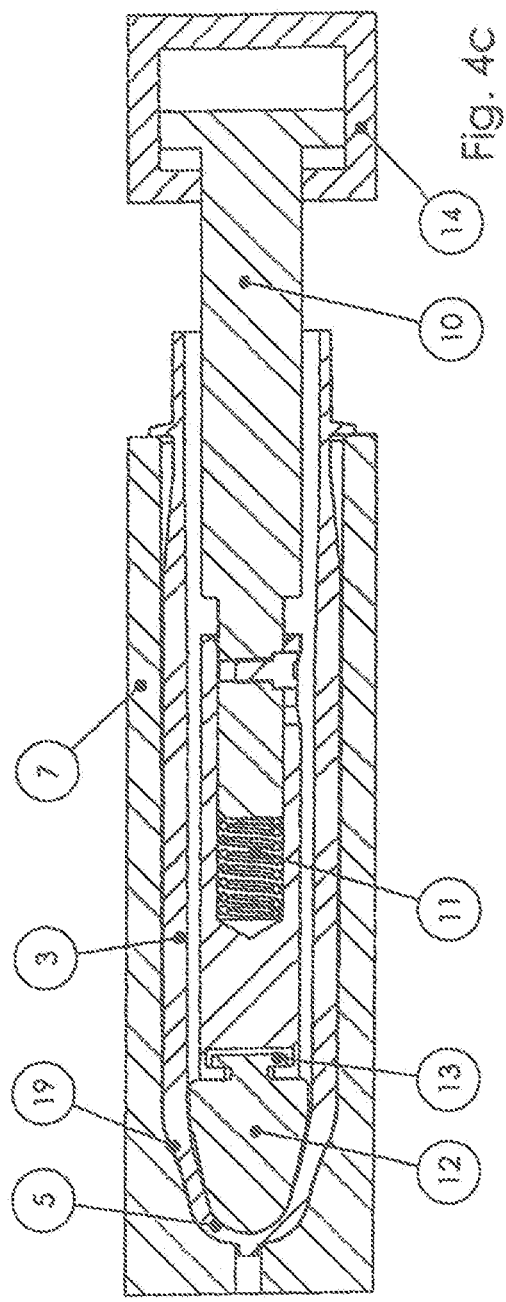
FIG. 4c shows a sectional view similar to 4a with the embossing operation completed
Figure 5:
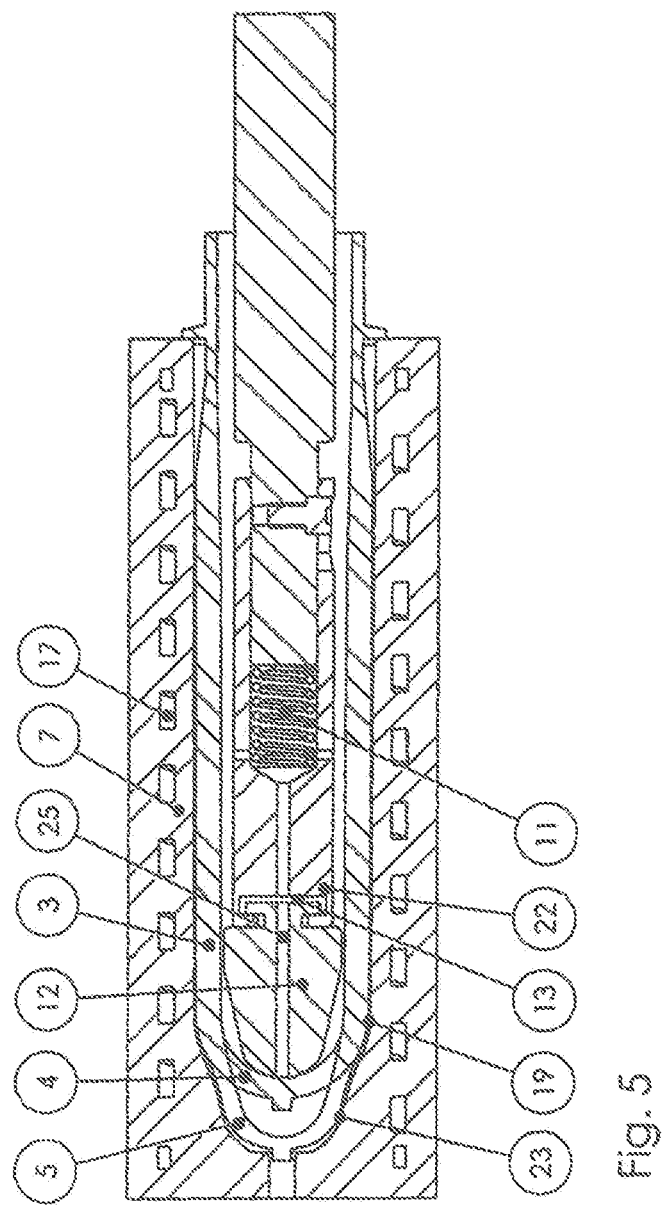
FIG. 5 shows a schematic sectional view of an embossing device consisting of a cooling sleeve with an enlarged cavity and an embossing mandrel, which together have the optimized geometry in the base region

In order to prepare the mold 8 as quickly as possible for the next injection-molding cycle, the removal arm 6 moves out of the mold region as shown in FIG. 3b. As it does so, it assumes a position that allows the preform mouths of the last-produced number of preforms 1 to be axially aligned with the same number of embossing mandrels 18, which are mounted on the embossing plate 9. For the sake of simplicity, the embossing plate 9 is mounted directly on the movable platen 15. However, it could also be an independently movable unit. As a result of the direct association of the embossing plate 9 with the movable platen 15, the embossing mandrels 18 are then inserted into the preform mouths during the closing operation of the mold 8, as shown in FIG. 3c. The structure of the embossing mandrels is represented in FIGS. 4a-c.

The embossing mandrels 18 consist substantially of an optional individual axial drive 14, a piston rod 10, a piston rod extension 22, which is sprung axially in relation to the piston rod by a compression spring 11, and an embossing body 12, which is mounted radially in a floating manner 13. The embossing body 12, at the front end of the embossing mandrel 18, may optionally be made of elastic or rigid material and optionally be temperature-controlled or water-cooled.

The force and the point in time for the actual embossing stroke may be determined by a dedicated drive for the embossing plate 9 as a whole and by the design of the compression spring 11. If, however, the embossing plate 9 is connected directly to the movable platen, the use of individual axial drives 14 is only necessary if the embossing time is to be delayed. If all of the individual axial drives 14 introduce the same force into the embossing operation, it is possible to dispense with the compression spring 11.

The preforms of FIG. 1 are borne by the inner contour of the cooling sleeves 7 in such a way that, in spite of the enlarged base geometry 20, they are reproducibly positioned and axially fixed. This is achieved by the base geometry 20 of the cooling sleeve 7 being designed in such a way that the domed preform end 4 reliably stands on a small annular area of a spherical shape 19, which forms an undercut. This area is designed such that the preform shaft 3 does not become jammed by the axial forces in the cooling sleeve 7 during the embossing.

Figure 6E:
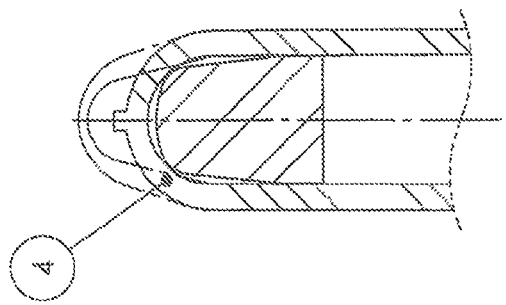
FIG. 6e shows a geometrically predetermined embossing body in conjunction with a cooling sleeve of dimensionally flexible material, which assumes the desired contour during the embossing
Figure 6D:
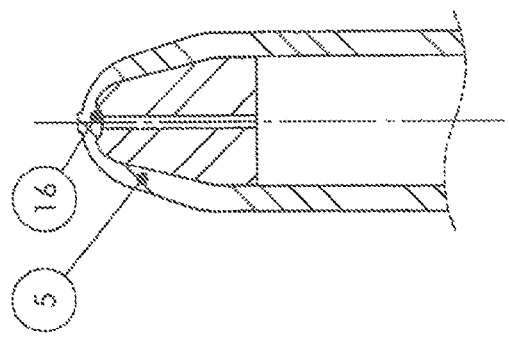
FIG. 6d shows a geometrically predetermined embossing body in conjunction with a cooling sleeve, which allows an accumulation of material in the gating region
Figure 6C:
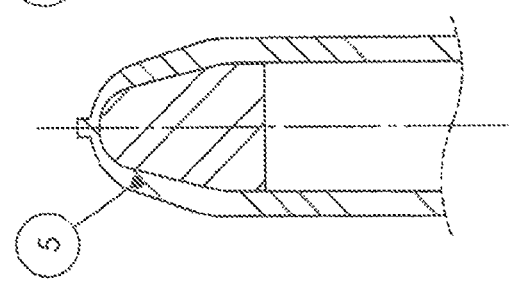
FIGS. 6a-c show the embossing sequence of the domed preform end by a geometrically predetermined embossing body and cooling sleeve
Figure 6B:
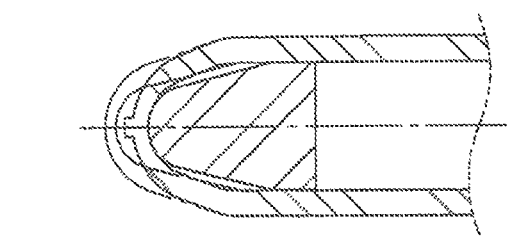
Figure 6A:
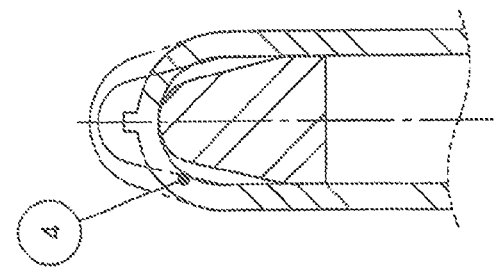

The embossing operation itself is represented in FIG. 5 and FIGS. 6*a-c*. Owing to the reproducible heat profile in the domed preform end 4, with the highest temperature at the gating point 24, which however decreases gradually toward the preform shaft, it may be appropriate first to apply the embossing body 12 there 24. However, there are also applications in which it is important that an accumulation of material comprising amorphous PET remains directly at the gating point 24. This can be ensured for example by an embossing body 16 that has instead of a domed end at its tip an annular point of application as in FIG. 6*d*. This would not begin with the embossing operation directly at the gating point 24, but annularly around the gating point. This ensures that the amorphous material can accumulate within the circular ring and not be forced away from the gate during the embossing. To ensure complete and reproducible molding, the enclosed air can escape by way of a vent 25 provided for this purpose. In addition, it is also possible to use dimensionally flexible embossing bodies as in FIG. 6*e*, which then do not have to be applied directly to the gating point 24. Due to their deformability, it is only with the completion of the embossing operation that they assume their optimal shape in the gating region 24, whereby more material can specifically remain there.

A further embodiment of the embossing unit according to FIG. 6*f* may contain in the embossing body 12, or most particularly in the base of the cooling sleeve 7, various types of grooves or ribs, which serve for additionally enlarging the surface area. A roughening of the surface additionally enhances this measure. A particular embodiment could be special geometries that assist the production of for example oval bottle bases or bottle bases with feet.

As a result of the described gradual further temperature progression of the domed preform end 4 in the preform shaft 3, during the embossing operation the material yields increasingly less readily in the direction of the preform shaft 3, whereby the wall thickness there is likewise gradually reduced increasingly less. This effect can be further enhanced by a convex base contour 23, since during the embossing the material in a plastic state rolls there from the preform shaft 3 to the gating point 24 over the intensively cooled surface, and consequently the effect of the gradually decreasing wall thickness progression is additionally enhanced. This effect is desired for the later blow-molding process, since the region of the preform shaft is closer to the heating-up device in the blow-molding machine than the gating point, which is always at the maximum distance from the heating when the preform is rotating.

The preform shaft 3 itself cannot yield during the embossing process, since its outer skin has cooled, and consequently a re-shaping is not possible under the embossing forces that are used. The domed preform end 5 that has then been optimized by mechanical embossing is intensively cooled, particularly in the previously hottest region, the gating point 24, due to the then smaller wall thickness and the increased surface area, whereby crystallizing out of the polymer is avoided.

Once the embossing operation has been completed, the embossing mandrels 18 can be retracted again at any time, at a time that is appropriate depending on the process. Depending on the number of multiply available cooling sleeves, the preforms 2, then optimized with a thin-walled base, can correspondingly remain in the cooling sleeves 7 for further production cycles, until they have cooled to an acceptable temperature and can then be ejected.

With preference, the embossing mandrel 18 is equipped with a vent 25, in order to help enclosed air to escape during the plastic deformation of the preform material in the region of the domed end.

The plastic deformation of the material in the region of the domed preform end by a mechanical shaping operation allows virtually any desired material distributions to be realized. When specifying the material distribution, no account has to be taken of any restrictions resulting from an injection molding operation or a blow-molding operation. The material distribution can consequently take place completely freely in accordance with the boundary conditions of the subsequent blow-molding operation for carrying out a biaxial material orientation. In particular, account can be taken of boundary conditions with regard to optimal heating of the preform in the region of the domed preform end and boundary conditions resulting from carrying out the blow-molding operation in the re-shaping of the preform to form the blow-molded container.

The mechanical shaping according to the invention in the region of the domed preform end makes it possible to carry out the molding operation without supplying compressed air and with preference under normal ambient pressure. With preference, no aids are used either in the subsequent blow-molding operation for the biaxial orientation of the material. There are consequently no increased requirements for example for the design and control of the stretching rod used for the blow-molding operation or the supply of compressed air used for the blow-molding operation.

It is consequently possible according to the invention to choose both the molding in the region of the preform and all of the parameters for the subsequent blow-molding operation completely independently of one another and optimized for the respective intended application.

According to an exemplary embodiment, it is thought to wait for a time period of 1 to 20 seconds before carrying out the embossing operation. In this time period, the preforms may for example be left in the cooling sleeves. Within the waiting time, a temperature equalization takes place in the base region of the preform. The equalization takes place both from the inside outward and in the direction of the gate.

LIST OF DESIGNATIONS

1 Preform according to the prior art
2 Preform with optimized, thin-walled base
3 Preform shaft
4 Domed preform end according to the prior art
5 Domed preform end optimized by embossing
6 Removal arm
7 Cooling sleeve
8 Mold
9 Embossing plate
10 Piston rod
11 Compression spring
12 Embossing body
13 Radially floating mounting of the embossing body 14 Individual axial drive of the embossing unit
15 Movable platen
16 Hollow on the embossing body
17 Water cooling
18 Embossing mandrel
19 Base contour with supporting circular ring of a spherical shape
20 Enlarged cooling sleeve geometry
21 Base area without cooling contact
22 Piston rod extension
23 Convex base contour
24 Gating point
25 Vent

The invention claimed is:

1. A method for producing a preform with an optimized base geometry, comprising: producing a finished preform from at least one injection-molded thermoplastic material that has a substantially thinner wall thickness in a domed end region of the preform than in a preform shaft and the wall thickness of the preform gradually becoming equal in the progression from a gate to the preform shaft, the preform being intended for re-shaping into blow-molded containers; opening a mold after solidifying of an outer skin of the preform after first intensive cooling; taking up the preforms from the open mold by a removal arm and cooling sleeves of the removal arm, the cooling sleeves cooling the preform shaft, but not the domed region, by contact cooling before an embossing operation; correspondingly mechanically deforming, in dependence on cooling sleeve geometry, the still plastically deformable domed region reproducibly by an embossing body, a contour of the cooling sleeve and of the embossing body being designed so that these contours are to a greatest extent replicated reproducibly on the demolded preform after the deforming operation; and, after the mechanically deforming, cooling the domed end region by wall contact of the cooling sleeves, wherein a geometrically determined embossing mandrel of the embossing body; and with a vent in combination with a geometrically determined base contour of the cooling sleeve deforms the polymer in a plastic state of the domed end region by pulling, pressing and pushing of the thermoplastic compound until a volume between the two contours is at least substantially filled with polymer and thereby limits a embossing stroke.

2. The method as claimed in claim 1, wherein the contact cooling of the cooling sleeve solidifies the preform shaft, while the domed region undergoes re-softening because of an absence of contact cooling.

3. The method as claimed in claim 2, including establishing a temperature range of between 90° C. and 150° C. in the domed end region.

4. The method as claimed in claim 1, wherein, during the mechanically deforming, the preform is axially supported on a supporting ring and/or in the domed end region within a new base contour by a circular ring of spherical shape.

5. The method as claimed in claim 1, wherein the timing of the mechanically deforming is freely determinable in each part of the process.

6. The method as claimed in claim 1, including individually setting an embossing force for each preform by mechanical or pneumatic springs.

7. The method as claimed in claim 1, wherein the embossing body is temperature-controlled or cooled.

8. The method as claimed in claim 1, wherein the cooling sleeve and/or the embossing body pre-form the preform base to special requirements for bottle shapes.

9. The method as claimed in claim 1, further including waiting 1 to 20 seconds before carrying out the mechanically deforming.

10. A device for producing a preform with a domed base end geometry optimized for a blow-molding process for producing containers, the finished preform produced having a much thinner wall thickness at a gating point than in a shaft region and, starting from the gating point, a further wall thickness progression in the domed end gradually matching a wall thickness of the preform shaft, the device comprising: a mold with one or more mold cavities for a first molding of preform geometries; an injection-molding device that plasticizes polymer raw material in order to introduce this plastic compound under pressure into cavities of the closed mold; a removal arm equipped with a number of cooled cooling sleeves for the removal of the preforms equivalent to the number of cavities in the mold, the cooling sleeves having an inner geometry that provides contact cooling to the preform shaft, but not, or only partially, in a region of the preform base; and mandrels with sprung and radially floatingly mounted embossing bodies are provided to enter axially open preforms so as, by a specially designed geometry contour; and of the cooling sleeve and of the embossing bodies and also by axial movement of the embossing bodies, to produce in the region of the domed base end a cavity which favors the shape of the finished preform, wherein the mandrel is a geometrically determined embossing mandrel with a vent in combination with a geometrically determined base contour of the cooling sleeve deforms the polymer in a plastic state of the domed end region by pulling, pressing and pushing of the thermoplastic compound until a volume between the two contours is at least substantially filled with polymer and thereby limits a embossing stroke.

11. The device as claimed in claim 10, wherein the embossing bodies are produced from elastic or rigid and heat-conducting material.

12. The device as claimed in claim 10, wherein the embossing bodies are cooled or temperature-controlled.

13. The device as claimed in claim 10, wherein the cooling sleeves are liquid-cooled.

14. The device as claimed in claim 10, wherein the embossing bodies are mounted axially resiliently and with spring forces that are individually determined.

15. The device as claimed in claim 10, wherein the embossing bodies are mounted in a radially floating manner.

16. The device as claimed in claim 10, wherein each embossing mandrel has an individual axial drive with preselectable stroke lengths and forces.

17. The device as claimed in claim 10, wherein the cooling sleeve in the base region and/or the embossing body is configured to further enlarge a surface area of the domed preform end by roughening or by ribs.

18. The device as claimed in claim 10, wherein the cooling sleeve in the base region and/or the embossing body have geometries that assist blow molding of special shaped bases.

19. The device as claimed in claim 10, wherein the embossing mandrel has at least one vent.

* * * * *